United States Patent [19]

Espiritu Santo et al.

[11] 4,422,341

[45] Dec. 27, 1983

[54] SNAP-IN DRAFT SENSOR

[75] Inventors: Eugenio Espiritu Santo; Kenneth D. Baxter, both of Cedar Falls, Iowa

[73] Assignee: Deere & Company, Moline, Ill.

[21] Appl. No.: 332,577

[22] Filed: Dec. 21, 1981

[51] Int. Cl.³ .......................... G01L 1/14; G01L 5/13
[52] U.S. Cl. .............................. 73/862.64; 73/862.57
[58] Field of Search .......... 73/862.38, 862.57, 862.62, 73/862.64, 779; 33/DIG. 5, 143 L, 147 K, 147 L

[56] References Cited

U.S. PATENT DOCUMENTS

| 1,528,627 | 3/1925 | Peters . | |
|---|---|---|---|
| 2,520,923 | 9/1950 | Franzel et al. . | |
| 2,550,588 | 4/1951 | Oberholtzer . | |
| 2,925,573 | 2/1960 | Brown et al. | 73/862.38 X |
| 3,073,155 | 1/1963 | Ianuzzi . | |
| 3,240,057 | 3/1966 | Ormond . | |
| 3,516,498 | 6/1970 | Schowalter . | |
| 3,994,348 | 11/1976 | Schowalter . | |
| 4,059,159 | 11/1977 | Moorhouse et al. | 33/147 K X |
| 4,253,331 | 3/1981 | Unruh . | |
| 4,283,942 | 8/1981 | Fishfader | 73/862.39 |

FOREIGN PATENT DOCUMENTS 989656  4/1965  United Kingdom ............. 73/862.62

Primary Examiner—Charles A. Ruehl

[57] ABSTRACT

A draft sensor includes a frame with an opening between a pair of spaced-apart portions which have a variable separation depending upon the force applied to the ends of the frame. Recesses or bores in the spaced-apart portions receive projections which project from the cap and base which form opposite ends of a transducer which contains a linear variable differential transformer. The transducer is spring-loaded to facilitate assembly or replacement of the transducer in the frame.

5 Claims, 2 Drawing Figures

SNAP-IN DRAFT SENSOR

BACKGROUND OF THE INVENTION

The present invention relates to a linkage and transducer assembly for sensing forces.

Various systems of linkages and transducers have been proposed to sense forces in members such as the links of the hitch for an agricultural implement. For example, U.S. Pat. No. 4,253,331 describes a diamond-shaped frame with a load cell device inserted therein. It appears, however, that assembly of this system or replacement of the load cell requires screwing or unscrewing a pair of threaded connections between the load cell and the frame. This is also the case with the draft sensor described in U.S. application, Ser. No. 228,440, filed 26 Jan. 1981 now U.S. Pat. No. 4,386,533 and assigned to the assignee of the present invention.

A variable inductive draft sensor is described in U.S. Pat. No. 3,994,348. However, mounting of the inductive draft sensor requires a threaded attachment. Furthermore, the '348 draft sensor must be anchored to the frame portion of the tractor and therefore, the sensor cannot be inserted in various of the hitch linkages, as may be desirable.

SUMMARY OF THE INVENTION

An object of the present invention is to provide a draft sensor with parts which may be easily assembled or replaced.

Another object of the present invention is to provide a draft sensor which is protected from contamination from the environment.

A further advantage of the present invention is to provide a draft sensor which may readily be adjusted.

These and other objects are achieved by the present invention which provides a frame which may be inserted in a linkage subject to force. The frame has a pair of links with ends connected together and with spaced-apart central portions therebetween. The central portions have bores or recesses for releasably receiving a pair of projections which project from opposite ends of an LVDT-type position transducer. The transducer has a cap and a base coupled to the core and coil portions, respectively, of the LVDT transducer. A spring or springs bias the cap and base apart so that the projections remain in the recesses or bores. The spring may be compressed to permit insertion or removal of the transducer from the frame. A rubber boot connected between the cap and base protects the LVDT components from the environment.

DETAILED DESCRIPTION

Figure 1:
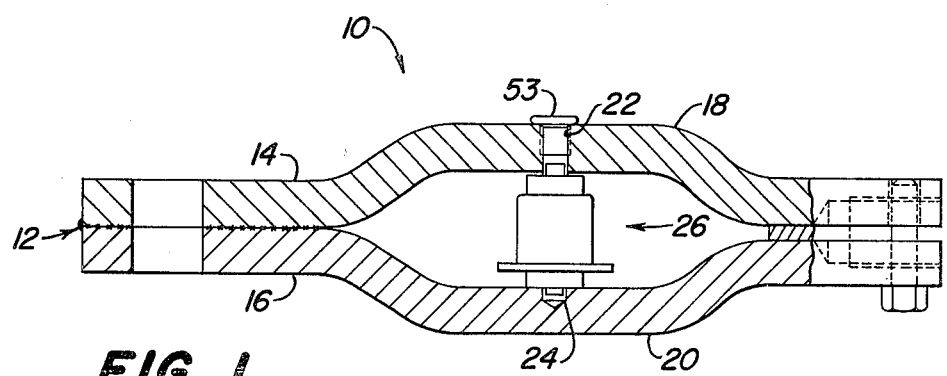
FIG. 1 is a partial sectional view of a draft sensor constructed according to the present invention.

A draft or force sensor 10 includes a frame 12 having a pair of links 14 and 16 having spaced-apart central portions 18 and 20. The link portion 18 includes a partially threaded bore 22 extending therethrough. The other link portion 20 includes a blind bore or recess 24. Further details pertaining to the links may be found in U.S. application, Ser. No. 228,440, filed 26 January 1981.

A spring-loaded, snap-in type transducer 26 is mounted in the opening between link portions 18 and 20 to sense the separation between portions 18 and 20 which varies as a function of the tension or compression-type forces applied to the ends of the frame 12. The sensor 10 can be inserted in any type of structural link wherein it is desired to measure the forces applied to the link. For example, the sensor 10 can be inserted in any link or links of a conventional-type 3-point hitch or other type hitch of an agricultural tractor (not shown) to measure draft forces applied to that link when the hitch is pulling an implement.

Figure 2:
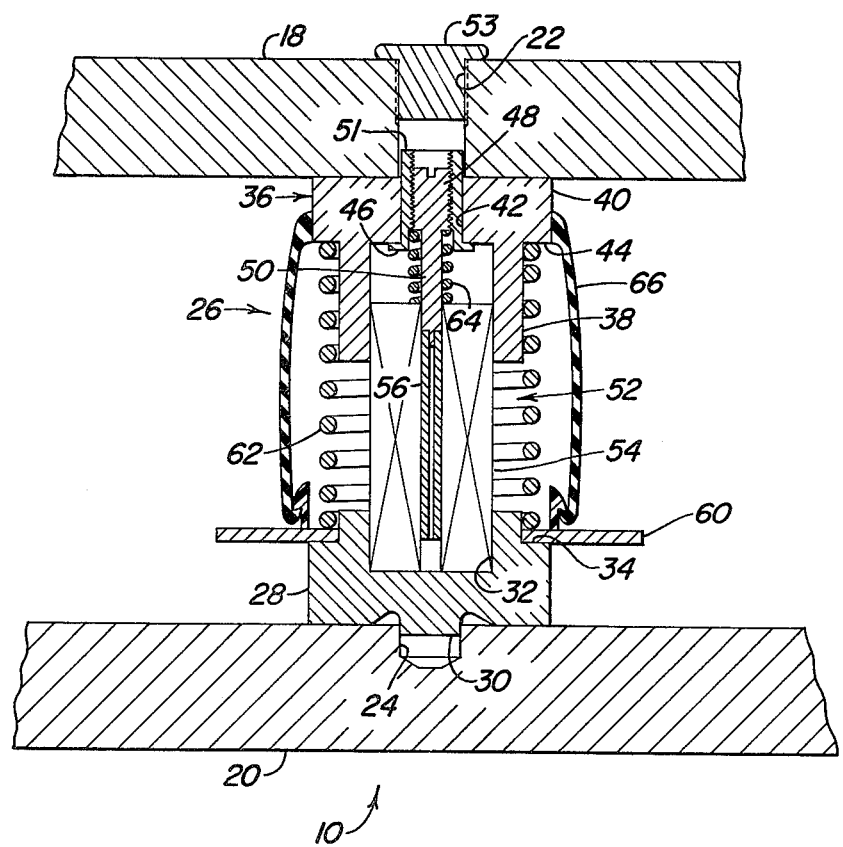
FIG. 2 is an enlarged cross-sectional view of a portion of FIG. 1.

Turning now to FIG. 2, the transducer 26 includes a cylindrical base 28 with a projection 30 which is received by the bore 24. The base 28 also includes a blind bore 32 and an annular shoulder 34. Transducer 26 also includes a cylindrical cap 36 with a hollow sleeve portion 38, a flange portion 40 which includes a bore 42 extending therethrough and which engages the link portion 18. The flange portion 40 defines an annular shoulder 44. A hollow flanged insert 46 is press-fitted into the bore 42. The insert 46 threadably receives a slotted adjustment and support member 48 which includes a shaft 50 which extends through an opening in the flange of insert 46. The outer end of insert 46 comprises a projection 51 which projects into bore 22. A cover screw 53 seals the outer end of bore 22, but may be removed to permit access to the adjustment member 48.

A conventional linear variable differential transformer or LVDT-type linear displacement sensor 52 is mounted between the base 28 and the cap 36. Such an LVDT is available from manufacturers such as Schaevitz Engineering or Trans-Tek, Inc. An LVDT transducer is superior to capacitive or resistive-type transducers because it is less affected by changes in the moisture content of the atmosphere. The LVDT 52 has a hollow, cylindrical coil assembly 54 which includes the usual one primary and two secondary coils (not shown). One end of the coil assembly is firmly held in bore 32 of base 28. The other end of coil assembly 54 is slidably received by the sleeve 38 of cap 36. A conventional hollow, cylindrical LVDT core member 56 is fixed to the end of shaft 50 of adjustment and support member 48 for reciprocal movement within the coil assembly 54.

A circuit board 60 may be mounted on the base 28 against shoulder 34. A spring 62 has one end engaging the circuit board 60 and another end engaging the shoulder 44 of cap 36. Spring 62 is biased to urge the base 28 and cap 36 away from each other to maintain the projections 30 and 51 positioned with bores 24 and 22, respectively. The spring 62 may be compressed to permit the insertion and removal of the transducer 26 from the frame 12. Another spring 64 is mounted around the shaft 50 and is coupled between a shoulder on member 48 and the end of core assembly 54 to urge them in opposite directions. A generally cylindrical and flexible rubber protective boot 66 protects the interior of the assembly from the environment.

As the tension or compression forces on the ends of the frame 12 are varied, the distance between link portions 18 and 20 varies, thus causing the position of LVDT core 56 to vary with respect to the coil assembly 54. A signal representing core-coil position, and thus, the force on frame 12 may be produced with the use of a conventional LVDT circuit, such as described on page 17-56 of Fink's "Electronics Engineers' Handbook, " published by McGraw-Hill Book Company.

The components of this circuit may be positioned on the circuit board 60.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A force sensor comprising:
    a deformable frame having spaced-apart portions defining an opening therebetween, and having a variable separation depending on force-induced deformation of the frame, each spaced-apart portion including a recess extending therein from the opening; and
    a snap-in, spring-loaded transducer means releasably mountable in the opening for sensing variations in separation between the spaced-apart portions of the frame, the transducer means including a base member having a projection which is releasably receivable by one of the recesses, a cap member having a stub which is releasably receivable by the other of the recesses and resilient means acting between the base and the cap members and biased for releasably maintaining the projection and the stub in their respective recesses, the transducer means further comprising a linear position sensor having a first member fixed to the base member and a second member movable with respect to the first member and coupled for movement with the cap member, the cap including means for adjusting the position of the second member with respect to the first member.

2. The force sensor of claim 1, wherein:
    the base comprises a cylindrical member having one end engageable with one of the spaced-apart portions, the projection axially from said one end, and having an opposite end including a blind bore extending axially therein for receiving a portion of the first member, the opposite end also including a reduced diameter portion received by one end of the resilient means; and
    the cap comprises a cylindrical piece having a flanged end engageable with the other of the spaced-apart portions, a first bore slidably receiving a portion of the first member, a second bore extending through the flange, a hollow interior threaded insert mounted in the second bore and having an end forming the stub, and wherein said means for adjusting comprises an outside threaded finger member threadably mounted in the insert and having a shaft extending out of the insert to an end fixed to the second member of the position sensor.

3. The force sensor of claim 2, wherein:
    the hollow insert includes a bore having a wall slidably engaging the shaft of the finger member to aid in maintaining proper alignment between the first and second members of the position sensor.

4. The force sensor of claim 1, wherein the transducer means includes a linear variable differential transformer having a hollow cylindrical coil assembly mounted for movement with one of the base and cap members and a core member slidably received by the coil assembly and mounted for movement with the other of the base and cap members.

5. The force sensor of claim 1, further comprising:
    flexible means connected to the base and cap members and sealingly enclosing a volume therebetween for protecting the transducer means from the environment.

* * * * *

UNITED STATES PATENT AND TRADEMARK OFFICE
CERTIFICATE OF CORRECTION

PATENT NO. : 4,422,341

DATED : 27 December 1983

INVENTOR(S) : Eugenio Espiritu Santo; Kenneth D. Baxter

It is certified that error appears in the above-identified patent and that said Letters Patent is hereby corrected as shown below:

Column 4, line 3, after "the projection" insert -- projecting --.

Signed and Sealed this

Thirteenth Day of November 1984

[SEAL]

Attest:

GERALD J. MOSSINGHOFF

Attesting Officer

Commissioner of Patents and Trademarks